United States Patent

Reckers

[15] 3,642,134
[45] Feb. 15, 1972

[54] METHOD AND APPARATUS FOR TERTIARY TREATMENT OF EFFLUENT

[72] Inventor: Donald J. Reckers, Cincinnati, Ohio
[73] Assignee: Pollution Control, Inc., Cincinnati, Ohio
[22] Filed: July 10, 1969
[21] Appl. No.: 840,645

[52] U.S. Cl. ..........................210/73, 210/80, 210/82, 210/104, 210/265, 210/275
[51] Int. Cl. ......................................................B01d 29/38
[58] Field of Search ..............210/73, 80, 82, 151, 104, 263, 210/275, 277, 278

[56] References Cited

UNITED STATES PATENTS

| | | | |
|---|---|---|---|
| 1,398,285 | 11/1921 | Tannea | 210/265 |
| 1,738,521 | 12/1929 | Bomhoff | 210/265 |
| 1,985,435 | 12/1934 | Watson | 210/104 |
| 2,760,643 | 8/1956 | Schaaf | 210/275 |
| 3,260,366 | 7/1966 | Duff et al. | 210/80 |
| 3,480,542 | 11/1969 | Bucksteeg et al. | 210/265 X |

FOREIGN PATENTS OR APPLICATIONS

| | | | |
|---|---|---|---|
| 18,106 | 8/1896 | Great Britain | 210/265 |

*Primary Examiner*—John Adee
*Attorney*—J. Warren Kinney, Jr.

[57] ABSTRACT

The floating and settleable solid pollutant particles in the effluent from a secondary treatment plant are separated, by reason of their different specific gravities from the effluent providing a residual effluent which contains substantially only the suspended solid pollutant particles of the original effluent and only the residual effluent is subjected to the action of a filter.

22 Claims, 4 Drawing Figures

PATENTED FEB 15 1972

INVENTOR
DONALD J. RECKERS

BY J. Warren Kinney Jr.
ATTORNEY

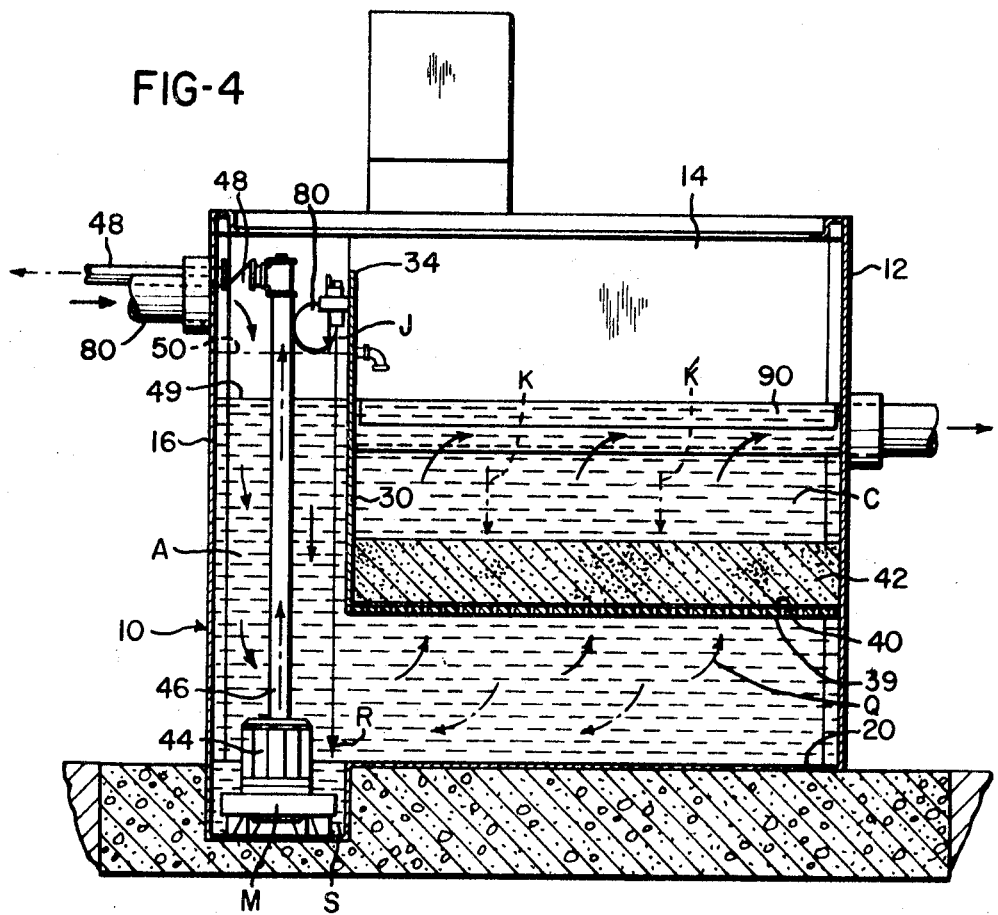

METHOD AND APPARATUS FOR TERTIARY TREATMENT OF EFFLUENT

This invention relates to a method of and apparatus for the tertiary treatment of sewage effluent from a secondary treatment plant.

The passage of the Federal Water Quality Act has made it mandatory for all state regulatory agencies to require a higher quality effluent from sewage treatment devices. In most instances this can be only accomplished by the addition of a tertiary treatment plant following the secondary treatment plant.

Most secondary treatment plants have the capacity and capability of consistently removing, at a reasonable cost, up to 90 percent of the pollutants initially in the sewage to be treated. However, most tertiary treatment plants that are presently available are capable of removing only 50 percent of the residual 10 percent of the pollutants in the effluent from the secondary treatment plant. The residual pollutants presently present in the effluent from tertiary treatment plants approximate 5 to 8 percent of the original sewage pollutants, and the cost of such tertiary treatment plants is frequently equal to or substantially in excess of the cost of the secondary treatment plant in which up to 90 percent of the original pollutants are removed.

The average composition of effluent from a secondary treatment plant contains three general types of solid particle pollutants in the following percentages, to wit:

A. approximately 20 percent floating solid particles, having a specific gravity of less than one, B. approximately 50 percent readily settleable solid particles, having a specific gravity greater than one, and C. approximately 30 percent suspended solid particles, having a specific gravity of one, which are, in a sense, uncertain whether to settle or float.

Heretofore tertiary treatment systems have been designed to receive the entire effluent from a secondary treatment plant, and to subject the entire effluent to filtration, in an effort to remove, by filtration, all three types of the aforementioned solid pollutant particles. When the filter media of a tertiary treatment plant is subjected to the entire effluent and all of the solid pollutant particles therein, the filter media will, in a comparatively short period of time, become completely clogged by the various solid pollutant particles in the effluent, and, unfortunately such clogging occurs at a time when the filter media becomes most effective in preventing those solids in colloidal suspension and solution from passing through the filter.

Clogging of the filter media requires that it be subjected to frequent backwashings with clear water for removing the solids from the filter media. Such backwashing procedure negates the effectiveness of the filter in its ability to prevent those solids in colloidal suspension and solution from passing through the filter media when flow of effluent from the secondary plant is resumed after the backwashing procedure has been completed.

A primary object of the present invention is to provide a method of and simple, yet highly effective means for preventing the floating solid particles and the readily settleable solid particles which collectively comprise approximately ⅔ of the solid pollutant particles in the effluent from a secondary treatment plant from reaching and/or being subjected to the action of the filter media. Stated differently, the present invention permits only those pollutants which are classifiable as suspended solid particles, having a specific gravity of one being subjected to the filter media and wherein the effluent containing the suspended solid particles is caused to pass upwardly through the filter media.

The present invention materially reduces the frequency at which the filter media is backwashed with the resultant benefit of increasing the effectiveness of the filter media in its ability to biologically remove the pollutants in solution and colloidal suspension.

By thus eliminating ⅔ of the solid pollutant particles from the action of the filter media, its efficiency is materially increased, and its size may be decreased. Whenever the filter media of the subject invention becomes loaded to such an extent that the rate of flow of the effluent containing the suspended solid particles is restricted to such an extent that the effluent level within the main reservoir of the tertiary treatment device rises to a predetermined height, the filter media is backwashed with the clear filtrate contained within a so-called clearwell immediately above the filter media. The capacity of the clearwell is such as to provide a sufficient volume or quantity of filtrate for backwashing the filter media; and since the clearwell is located immediately above the filter media or filter bed the clear filtrate will flow by gravity through the filter during backwashing.

The overflow of clear filtrate from the clearwell is carried from the unit by means of an effluent discharge trough.

Whenever backwashing of the filter media occurs, substantially the entire contents of the tertiary treatment plant are pumped back to the secondary treatment plant at a rate approximately five times the rate at which the effluent from the secondary treatment plant was initially delivered to the tertiary treatment plant; said pumping action effectively removes the floating solid particles, the readily settleable solid particles as well as the suspended solid particles backwashed from the filter media.

In the present system no additional or outside source of water is required during or for effecting the backwash cycle, as in other tertiary treatment plants, since the clarified effluent of filtrate in the clearwell is caused to pass downwardly by gravity through the filter media into the receptacle as a result of the pumping action thereby cleansing said filter media of suspended solid particles. It has been observed that the aforesaid backwashing cycle does not negate the effectiveness of the filter media in its biological removal of the solid pollutant particles in solution and colloidal suspension in the effluent passing upwardly through the filter media after a backwashing cycle has been completed.

Apparatus for use in practicing my method of tertiary treating the effluent from a secondary treatment plant may include a receptacle having an influent well characterized by a sufficient surface area and settling rate to entrap the floating solid pollutant particles, and characterized by a hopper or chamber bottom having sufficient surface area to collect the settleable solid particles in such a manner that neither the floating solid particles nor the settleable solid particles will come in contact with the filter media during those periods of time when the effluent containing the suspended solid particles is being subjected to the action of the filter media.

The effectiveness of the subject method and apparatus may be appreciated from the fact that all but approximately 2 percent of the solid pollutant particles originally in the sewage treatment will have been removed from the sewage at an equipment cost which is but a fraction of the cost of the secondary treatment plant.

An important feature of the subject invention is that the method of and apparatus for subjecting the effluent from a secondary treatment plant to a tertiary treatment and that the effectiveness and operating characteristics of the system are not adversely effected by climatic conditions, and in particular the subject system will not freeze up in cold weather, thereby insuring dependable, year-round operation.

An object of the invention is to teach a method of effectively removing the solid pollutant particles from the effluent of a secondary treatment plant by subjecting only the suspended solid particles to the action of a filter media.

Another object of the invention is to provide simple, inexpensive, yet highly efficient apparatus for treating the effluent from a secondary treatment plant for removing 90 percent of the solid pollutants in the effluent from the secondary treatment plant.

These and other objects are attained by the means described herein and as disclosed in the accompanying drawings in which:

FIG. 4 is a sectional view, illustrating a modification in the structural details of the device illustrated in FIG. 1.

Figure 1:
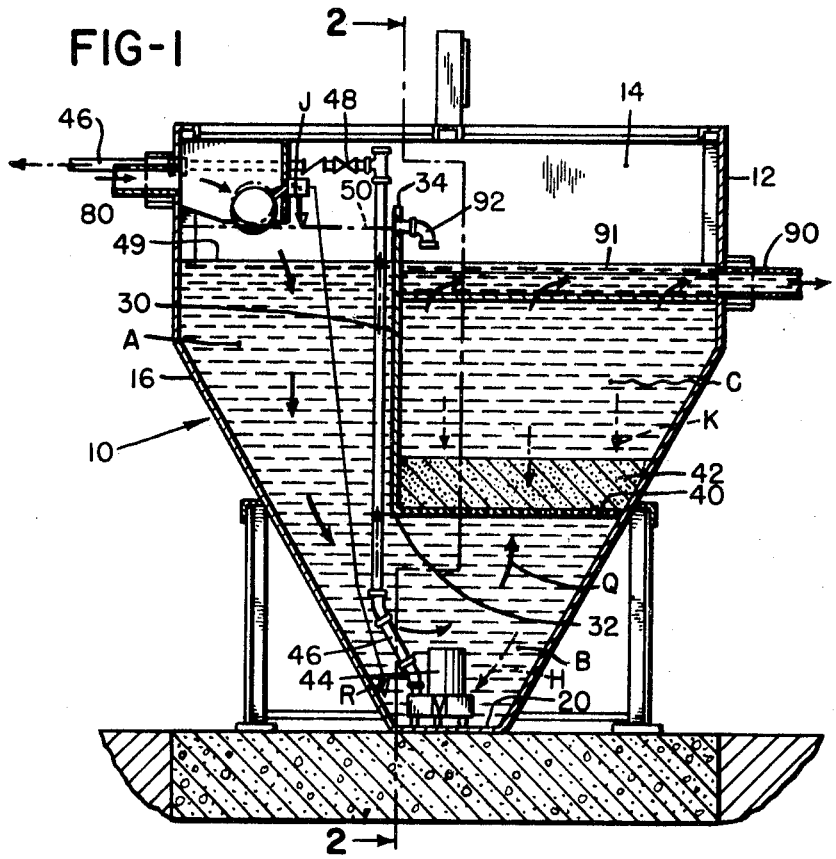
FIG. 1 is a vertical section taken through a device embodying the teachings of the present invention.
Figure 2:
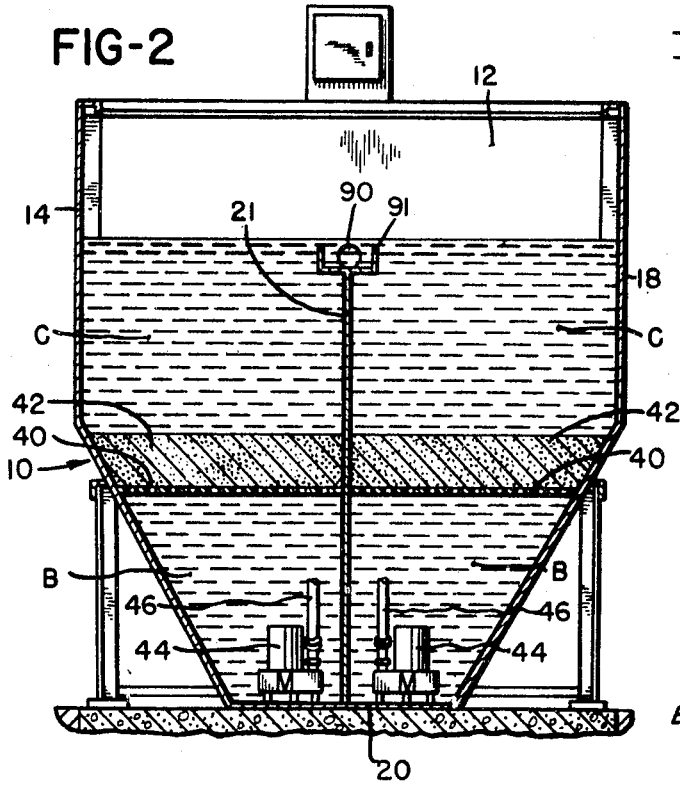
FIG. 2 is a sectional view taken on line 2—2 of FIG. 1, illustrating a pair of treatment chambers within the housing.

With particular reference now to FIGS. 1 and 2, the numeral 20 denotes generally a housing, receptacle or vessel having upstanding sidewalls 12, 14, 16 and 18, a bottom wall 20 and a divider wall 21 (FIG. 2) which subdivides the housing into two, similar, but independently operable subunits. If desired, each of the sidewalls may be inclined as illustrated in FIGS. 1 and 2, or the walls may be substantially vertical through their entire height as illustrated in FIG. 4.

The numeral 30 denotes an upstanding fluid-impervious wall or barrier which spans one pair of opposed sidewalls, such as 14 and 18 for subdividing the upper portion of the interior of said receptacle into areas A and C, for inlet chamber A and clear wall chamber C. The lower end of wall 30 terminates at 32 at a location a substantial distance above bottom wall 20. The upper end 34 of said wall terminates above the highest level 50 which the effluent in chamber A will ever rise.

A fluid-pervious member 40 which, by way of example, may be fabricated from metallic screen-mesh, or the like, extends in a substantially horizontal position from the lower end 32 of wall 30 to sidewall 12 for thereby defining the bottom of area C.

A quantity of filter media 42, such as sand, or other suitable filter substance whether granular, or otherwise, is supported by horizontal member 40, as illustrated.

A liquid submersible pump 44 is provided in the bottom of each unit of the receptacle, in area B wherein the outlet of said pump is connected by a pipe 46 to the secondary treatment plant whereby everything which is pumped through pipes 46 will pass through check valves 48 and thence be returned to the secondary treatment plant for further processing.

The operation of each of pumps 44 is such that they will be individually and independently operated whenever the level of the effluent in area A rises from its normal level, indicated by the numeral 49 (FIG. 1) to a level, such as indicated by the broken line 50. Once operative, the pump will continue to pump until the level of fluid in area B has been lowered to the bottom of said area.

The present invention is neither directed to nor concerned with the particular electrical means by which the pump is controlled, however solely by way of example, and for illustrating one operative relationship, said pump may be controlled by electrodes J and R, it being noted that whenever the level of the fluid within chamber A rises to 50 it will contact electrode J thereby closing an electrical circuit to the motor of pump 44. The pump will continue to operate until such time as the fluid level within receptacle 10 is lowered to the level of electrode R.

Figure 3:
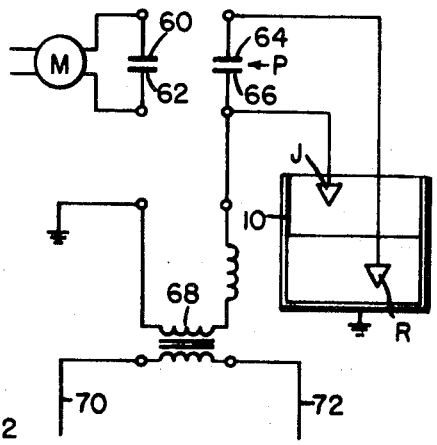
FIG. 3 is a schematic view of an electrical control circuit for the pumps.

With particular reference now to FIG. 3 contacts P will close when the effluent level within receptacle 10 rises to the high electrode J thereby closing an electrical circuit to the motor of pump 44. Said contacts will not open until the level within receptacle 10 has been lowered to the tip of lower electrode R. Contacts 60 and 62 function as a load contact whereas contacts 64 and 66 serve as a holding or sealing contact in the electrode circuit. The numeral 68 denotes a transformer, the numerals 70 and 72 a source of AC power. Inasmuch as the circuitry of FIG. 3 is conventional, and no part of the inventive concept, further description thereof is believed unnecessary.

Effluent from a secondary treatment plant is introduced into the upper portion of area A via conduit 80 it being noted that area A has sufficient surface area and a settling rate whereby to entrap the floating solids of the effluent introduced through conduit 80 which means that the downflow rate of the effluent is less than the upflow rate of the floating particles. The settleable solids of the effluent will collect in the lower portion of the receptacle in area B, whereas the effluent containing the suspended solids having a specific gravity of unity will flow under the barrier wall 30 thence upwardly (as per headed arrow Q) through fluid-pervious member 40, filter bed 42 and thence into area C which will hereinafter be referred to as a clearwell or chamber. The overflow from clearwell C is discharged from reservoir 10 via conduit 90.

As used hereinafter, the term residual effluent refers to the effluent within the reservoir from which the floatable and settleable solid pollutant particles have been removed or separated by reason of their respective specific gravities, and which contains substantially only the suspended solid pollutant particles, the said residual effluent being subjected to the action of the filter media.

The numeral 92 denotes an overflow opening in the upper end of barrier wall 30 through which effluent from conduit 80 may be discharged directly into the effluent discharge trough 91 whenever the level of the effluent within area A rises to a location above level 50, such as, by way of example would occur in the event that the electrical systems should fail and/or in the event that the rate of effluent flow from the secondary treatment plant should for some reason become abnormally high.

With particular reference now to area B it will be noted that the settleable solids will be deposited in this area as long as the upflow rate of the effluent is less than the downflow rate of the settleable solids, such as will occur when the flow rate of effluent into area B is approximately 2 feet per hour.

With further reference now to the clearwell, it should be understood that as the residual effluent containing the suspended solids passes upwardly by gravity through filter media 42, a slime layer of filterable suspended solids will accumulate which will biologically remove substantially all of the pollutants in solution and colloidal suspension so that the liquid contents of the clearwell will, for all practical purposes, constitute a clear filtrate containing but approximately 2 percent of the pollutants in the sewage initially treated.

From the foregoing it will be noted that my filter media is subjected only to the suspended solids of the effluent discharged into receptacle 10 which materially and substantially lessens the rate at which the filter media becomes "loaded." Whenever the up-flow of residual effluent through the filter media is such that the level of effluent within area A is elevated from its normal level 49 to level 50, pump 46 will be automatically actuated for pumping out substantially the entire contents of receptacle 10.

In the preferred embodiment of the invention the rate at which the pump will evacuate the contents of receptacle 10 is 5 times the rate at which the effluent is normally introduced into the receptacle via conduit 80. The rapid removal of the contents of the receptacle will result in the filter media being backwashed by the clear filtrate from the clearwell. It will be noted that gravity assists to remove the solid particles from the filter media during backwashing. From the foregoing it will be noted that backwash of the filter media does not require the use of outside fluid under pressure since the contents of the clearwell C are adequate for this purpose.

With particular reference now to FIG. 4 it will be noted that pump 44 is located in a sump S in bottom wall 20 of the area B of the receptacle 10. As earlier indicated, the sidewalls of the device of FIG. 4 are substantially vertical however the operating characteristics are identical with those of FIGS. 1 and 2.

The device of FIG. 4 utilizes a bar grating 39 for supporting screen 40 which in turn supports the bed of filter media 42.

From the foregoing it will be appreciated that the filter media is subjected only to the clogging action of the suspended solid pollutant particles which constitute but 30 percent of the total solid pollutant particles of the effluent received from the secondary treatment plant. By filtering only the suspended solid particles I have greatly improved the overall efficiency, and have substantially lowered the cost of the tertiary treatment plant.

Since all flow through the filter media during its filtering and backwash cycles is gravitational, the need for pumps, except for evacuating the contents of the reservoir during a backwash cycle is eliminated.

In FIGS. 1 and 4 the headed arrows indicated by the letter K denote the flow of filtrate from the clearwell area C during the backwash cycle.

What is claimed is:

1. The method of operating a system for the tertiary treatment of sewage effluent from a secondary treatment plant, which comprises the steps of introducing effluent from a secondary treatment plant into an inlet chamber of a receptacle at a predetermined rate such that the downflow rate of effluent in the inlet chamber is less than the upflow rate of floatable solid particles, separating the floatable solid pollutant particles and the settleable solid pollutant particles from the effluent in the inlet chamber, passing the residual effluent containing suspended solid pollutant particles upwardly through a filter media and filtering said suspended solid particles from said effluent with said filter, accumulating the clear filtrate which passed through said filter media in a clearwell chamber immediately above and in open communication with the filter media, so that said filter media is subjected only to the suspended solid pollutant particles in the effluent passed therethrough from the secondary treatment plant to substantially reduce the clogging rate of said filter media, and bypassing the effluent around the filter media from the inlet chamber to the clearwell chamber at an upper portion of the inlet chamber when the effluent reaches a predetermined level in the inlet chamber.

2. The method as called for in claim 1, wherein the effluent containing the suspended solid pollutant particles is passed by gravitational flow downwardly through said inlet chamber and thence upwardly through the filter media.

3. The method as called for in claim 2 in which the filtrate which has passed through the filter media is accumulated above the filter media in such quantity as to backwash the filter at the end of a filtering cycle.

4. The method as called for in claim 1, wherein floatable solid pollutant particles accumulate on the top of the effluent being introduced into the receptacle, and wherein the settleable solid pollutant particles settle out of the effluent and are accumulated on the bottom of the receptacle.

5. The method as called for in claim 1, wherein the filter is backwashed by flowing the filtrate downwardly therethrough.

6. The method of operating the system of claim 1, which comprises the additional steps of backwashing the filter media by withdrawing the contents of the receptacle for reversing the flow of filtrate through the filter media.

7. The method of operating the system of claim 1, which comprises the steps of backwashing the filter media by lowering the contents of the receptacle below said filter media for gravitationally discharging the clear filtrate downwardly through the filter media.

8. The method of operating the system of claim 7, wherein the rate at which the contents of the receptacle is lowered is approximately five times the rate at which the effluent from the secondary treatment plant is introduced into the receptacle.

9. A tertiary treatment plant for treating the effluent from a secondary treatment plant, comprising, in combination, a receptacle having sidewalls and a closed bottom, wall means in the interior of said receptacle, said interior wall means dividing the interior of said receptacle into an inlet chamber and a clearwell chamber, said clearwell chamber defined by fluid impervious sidewalls and a fluid pervious bottom wall, filter media supported on said bottom wall, an effluent inlet in open communication with the inlet chamber in the interior of said receptacle, and a fluid outlet in open communication with the clearwell chamber, said inlet chamber having a predetermined size and volumetric capacity, and a settling rate such as to provide sufficient surface area and volume of effluent therein that the downflow rate of effluent is less than the upflow rate of floating particles so that the floatable solid pollutant particles and the settleable solid pollutant particles will separate out of the effluent by reason of their different specific gravities, leaving a residual effluent containing substantially only the suspended solid pollutant particles of the original effluent, means for causing the residual effluent containing suspended solid pollutant particles to pass upwardly through the filter media to filter the suspended solid pollutant particles from the residual effluent, and bypass means in an upper portion of said interior wall means for bypassing effluent from the inlet chamber to the outlet when the effluent in the inlet chamber reaches a predetermined level.

10. The tertiary treatment plant as called for in claim 9 wherein the bottom wall of the clearwell chamber is spaced above the bottom of the receptacle for providing a clear, unobstructed area beneath the filter media in open communication with the interior of the receptacle.

11. The tertiary treatment plant as called for in claim 9, wherein the filter media is located in the lower half of the receptacle.

12. A tertiary treatment plant as called for in claim 10 which includes means for evacuating the contents of the inlet chamber whenever the height of the effluent therein reaches a predetermined level, and wherein said evacuation gravitationally releases the entire contents of the clearwell downwardly through the filter media thereby flushing the solid particles entrapped in said media back into the inlet chamber.

13. The tertiary treatment plant as called for in claim 12, wherein the means for evacuating the contents of the inlet chamber comprises a motor-driven pump having an intake in open communication with the lowermost portion of the receptacle, and means responsive to the level of the contents of the inlet chamber for completing an electrical circuit to the motor of said motor-driven pump whenever the level reaches a predetermined height and of maintaining said electrical circuit until the level has been lowered to the bottom of said receptacle.

14. The tertiary treatment plant as called for in claim 13, wherein is included means for evacuating the contents of the reservoir at a rate approximately five times the rate at which effluent from a secondary treatment plant is introduced into said reservoir.

15. A tertiary treatment plant as in claim 9, wherein said receptacle sidewalls and closed bottom are substantially rectangular, and said interior wall means and said receptacle wall means define a substantially rectangularly shaped inlet chamber and a substantially rectangularly shaped clearwell chamber, sump means in the bottom of said receptacle in communication with said inlet chamber, and pump means in said sump means for pumping effluent from said inlet chamber.

16. A tertiary treatment plant for treating the effluent from a secondary treatment plant, comprising in combination, a receptacle having sidewalls and a bottom, wall means in said receptacle dividing said receptacle into an inlet chamber and a clearwell chamber, said clearwell chamber defined by fluid-impervious sidewalls and a fluid-pervious bottom wall, filter media supported on said bottom wall, an effluent inlet in open communication with said inlet chamber, a fluid outlet in open communication with the clearwell chamber, and bypass means in an upper portion of one of said interior wall means establishing a fluid bypass from said inlet chamber to said clearwell chamber in bypassing relationship to said filter media whenever the effluent in said inlet chamber reaches a predetermined level.

17. A tertiary treatment plant as in claim 16, wherein said interior wall means includes an upstanding fluid-impervious wall spanning said receptacle walls, the lower end of said upstanding wall terminating above said receptacle bottom wall, a substantially horizontal, fluid-pervious bottom wall extending from the lower edge of said upstanding wall to a sidewall of said receptacle for subdividing the receptacle into said inlet chamber and clearwell chamber, said effluent inlet being in open communication with the upper part of said inlet chamber and remote from said clearwell; said fluid outlet being in open communication with the upper part of said clearwell, whereby effluent will pass by gravity downwardly through said inlet chamber and thence upwardly through said filter media.

18. A device as called for in claim 16 which includes a pump having an inlet in open communication with the bottom-adjacent portion of the receptacle, control means for selectively actuating said pump for evacuating the contents of said receptacle and discharging the contents of the clearwell through the filter media for gravitationally backwashing the filter bed.

19. A device as called for in claim 18 which includes means for automatically operating said pump whenever the level of the effluent within said receptacle raises above a predetermined level as a result of the impairment of the filter bed to accommodate the free flow of effluent upwardly through said filter bed.

20. A device as set forth in claim 17 wherein said fluid bypass is in that portion of the upstanding wall at a location above the fluid outlet of said clearwell; said fluid bypass adapted to permit effluent to flow directly from the fluid inlet into the upper portion of said clearwell.

21. A tertiary treatment plant as in claim 16, wherein an effluent discharge trough is in said clearwell chamber at the upper portion thereof and is in communication at one end with said fluid outlet and at the other end with said fluid bypass so that effluent which flows through said bypass is discharged directly into the effluent discharge trough and outlet.

22. A tertiary treatment plant as in claim 17, wherein said upstanding wall subdivides the interior of said receptacle into a pair of inlet chambers and a pair of clearwell chambers, each operating independently of the other and including a filter media between the inlet chamber and clearwell chamber of each.

* * * * *